(12) United States Patent
Devine et al.

(10) Patent No.: US 12,688,063 B1
(45) Date of Patent: *Jul. 21, 2026

(54) ASYNCHRONOUS AND PARALLEL APPLICATION PROCESSING

(71) Applicant: Caret Holdings, Inc., Columbus, OH (US)

(72) Inventors: James Wilbert Devine, Columbus, OH (US); Daniel Craig Manges, Powell, OH (US)

(73) Assignee: CARET HOLDINGS, INC., Columbus, OH (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/938,586

(22) Filed: Oct. 6, 2022

Related U.S. Application Data

(63) Continuation of application No. 16/777,475, filed on Jan. 30, 2020, now Pat. No. 11,494,230.

(51) Int. Cl.
G06F 15/16 (2006.01)
G06F 9/48 (2006.01)
(Continued)

(52) U.S. Cl.
CPC .......... G06F 9/4881 (2013.01); G06F 16/211 (2019.01); G06F 16/2282 (2019.01); G06F 16/2474 (2019.01)

(58) Field of Classification Search
None
See application file for complete search history.

(56) References Cited

U.S. PATENT DOCUMENTS 8,140,659 B2 * 3/2012 Carl ........................ H04L 67/60
709/224
2005/0015763 A1 1/2005 Alexander et al.
(Continued)

FOREIGN PATENT DOCUMENTS

WO WO-2021155064 A1 8/2021

OTHER PUBLICATIONS

"U.S. Appl. No. 16/777,475, Non Final Office Action mailed May 10, 2022", 13 pgs.
(Continued)

*Primary Examiner* — Alex Gofman
(74) *Attorney, Agent, or Firm* — SCHWEGMAN LUNDBERG & WOESSNER, P.A.

(57) ABSTRACT

Input records are obtained based on a request to process an application. References to the input records are stored as entries in a queue. A total thread number for threads and a total server number for servers are determined. The threads are initiated on the servers and are asynchronously processed in parallel on the servers. Each thread obtains a reference from a unique entry of the queue, marks that entry as being addressed, processes the input record corresponding to the entry using values provided with a request to process the application, stores results associated with processing the input record in a data store, and iterates back to obtain a next unique entry from the queue until every entry of the queue is marked as having been addressed. When every entry of the queue is marked, a reference is returned to the data store as application results for processing the application.

7 Claims, 4 Drawing Sheets

(51) Int. Cl.
| | |
|---|---|
| *G06F 16/21* | (2019.01) |
| *G06F 16/22* | (2019.01) |
| *G06F 16/2458* | (2019.01) |

(56) References Cited

U.S. PATENT DOCUMENTS

| | | | |
|---|---|---|---|
| 2005/0027693 A1* | 2/2005 | Yagawa | G06F 16/24561 |
| 2006/0136273 A1 | 6/2006 | Zizzamia et al. | |
| 2008/0028068 A1* | 1/2008 | Nochta | H04W 28/0268 709/224 |
| 2008/0300900 A1 | 12/2008 | Demarest et al. | |
| 2015/0193238 A1* | 7/2015 | Kalogeropulos | G06F 9/5044 712/35 |
| 2015/0199219 A1* | 7/2015 | Kim | H04L 67/14 718/104 |
| 2016/0162532 A1* | 6/2016 | Zhang | G06F 16/2343 707/704 |
| 2017/0116038 A1* | 4/2017 | Netto | G06Q 10/06311 |
| 2018/0198858 A1 | 7/2018 | Pal et al. | |
| 2019/0166506 A1* | 5/2019 | Ashrafi | H04B 1/0003 |

| | | |
|---|---|---|
| 2020/0125400 A1 | 4/2020 | Venkataraman et al. |
| 2020/0192725 A1 | 6/2020 | Feldkamp |
| 2021/0240523 A1 | 8/2021 | Devine et al. |

OTHER PUBLICATIONS

"U.S. Appl. No. 16/777,475, Notice of Allowance mailed Sep. 14, 2022", 11 pgs.

"U.S. Appl. No. 16/777,475, Response filed Aug. 4, 2022 to Non Final Office Action mailed May 10, 2022", 11 pgs.

"International Application Serial No. PCT/US2021/015579, International Search Report mailed Apr. 12, 2021", 2 pgs.

"International Application Serial No. PCT/US2021/015579, International Search Report mailed Apr. 27, 2021", 2 pgs.

"International Application Serial No. PCT/US2021/015579, Written Opinion mailed Apr. 12, 2021", 9 pgs.

"International Application Serial No. PCT/US2021/015579, Written Opinion mailed Apr. 27, 2021", 9 pgs.

"International Application Serial No. PCT/US2021/015579, International Preliminary Report on Patentability mailed Aug. 11, 2022", 11 pgs.

* cited by examiner

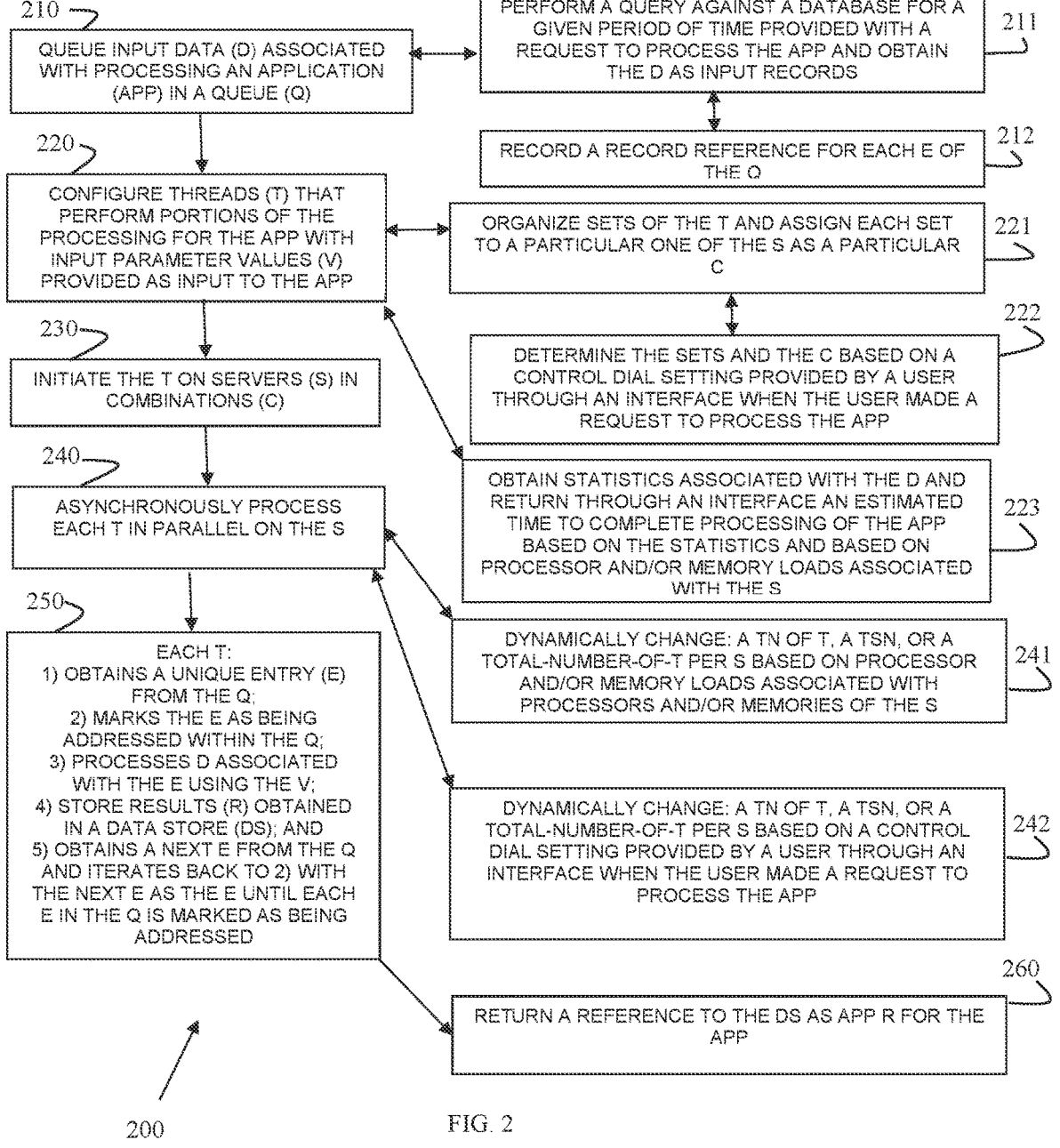

210 —

QUEUE INPUT DATA (D) ASSOCIATED WITH PROCESSING AN APPLICATION (APP) IN A QUEUE (Q)

211

PERFORM A QUERY AGAINST A DATABASE FOR A GIVEN PERIOD OF TIME PROVIDED WITH A REQUEST TO PROCESS THE APP AND OBTAIN THE D AS INPUT RECORDS

212

RECORD A RECORD REFERENCE FOR EACH E OF THE Q

220 —

CONFIGURE THREADS (T) THAT PERFORM PORTIONS OF THE PROCESSING FOR THE APP WITH INPUT PARAMETER VALUES (V) PROVIDED AS INPUT TO THE APP

221

ORGANIZE SETS OF THE T AND ASSIGN EACH SET TO A PARTICULAR ONE OF THE S AS A PARTICULAR C

230 —

INITIATE THE T ON SERVERS (S) IN COMBINATIONS (C)

222

DETERMINE THE SETS AND THE C BASED ON A CONTROL DIAL SETTING PROVIDED BY A USER THROUGH AN INTERFACE WHEN THE USER MADE A REQUEST TO PROCESS THE APP

240 —

ASYNCHRONOUSLY PROCESS EACH T IN PARALLEL ON THE S

223

OBTAIN STATISTICS ASSOCIATED WITH THE D AND RETURN THROUGH AN INTERFACE AN ESTIMATED TIME TO COMPLETE PROCESSING OF THE APP BASED ON THE STATISTICS AND BASED ON PROCESSOR AND/OR MEMORY LOADS ASSOCIATED WITH THE S

250 —

EACH T:
1) OBTAINS A UNIQUE ENTRY (E) FROM THE Q;
2) MARKS THE E AS BEING ADDRESSED WITHIN THE Q;
3) PROCESSES D ASSOCIATED WITH THE E USING THE V;
4) STORE RESULTS (R) OBTAINED IN A DATA STORE (DS); AND
5) OBTAINS A NEXT E FROM THE Q AND ITERATES BACK TO 2) WITH THE NEXT E AS THE E UNTIL EACH E IN THE Q IS MARKED AS BEING ADDRESSED

241

DYNAMICALLY CHANGE: A TN OF T, A TSN, OR A TOTAL-NUMBER-OF-T PER S BASED ON PROCESSOR AND/OR MEMORY LOADS ASSOCIATED WITH PROCESSORS AND/OR MEMORIES OF THE S

242

DYNAMICALLY CHANGE: A TN OF T, A TSN, OR A TOTAL-NUMBER-OF-T PER S BASED ON A CONTROL DIAL SETTING PROVIDED BY A USER THROUGH AN INTERFACE WHEN THE USER MADE A REQUEST TO PROCESS THE APP

260

RETURN A REFERENCE TO THE DS AS APP R FOR THE APP

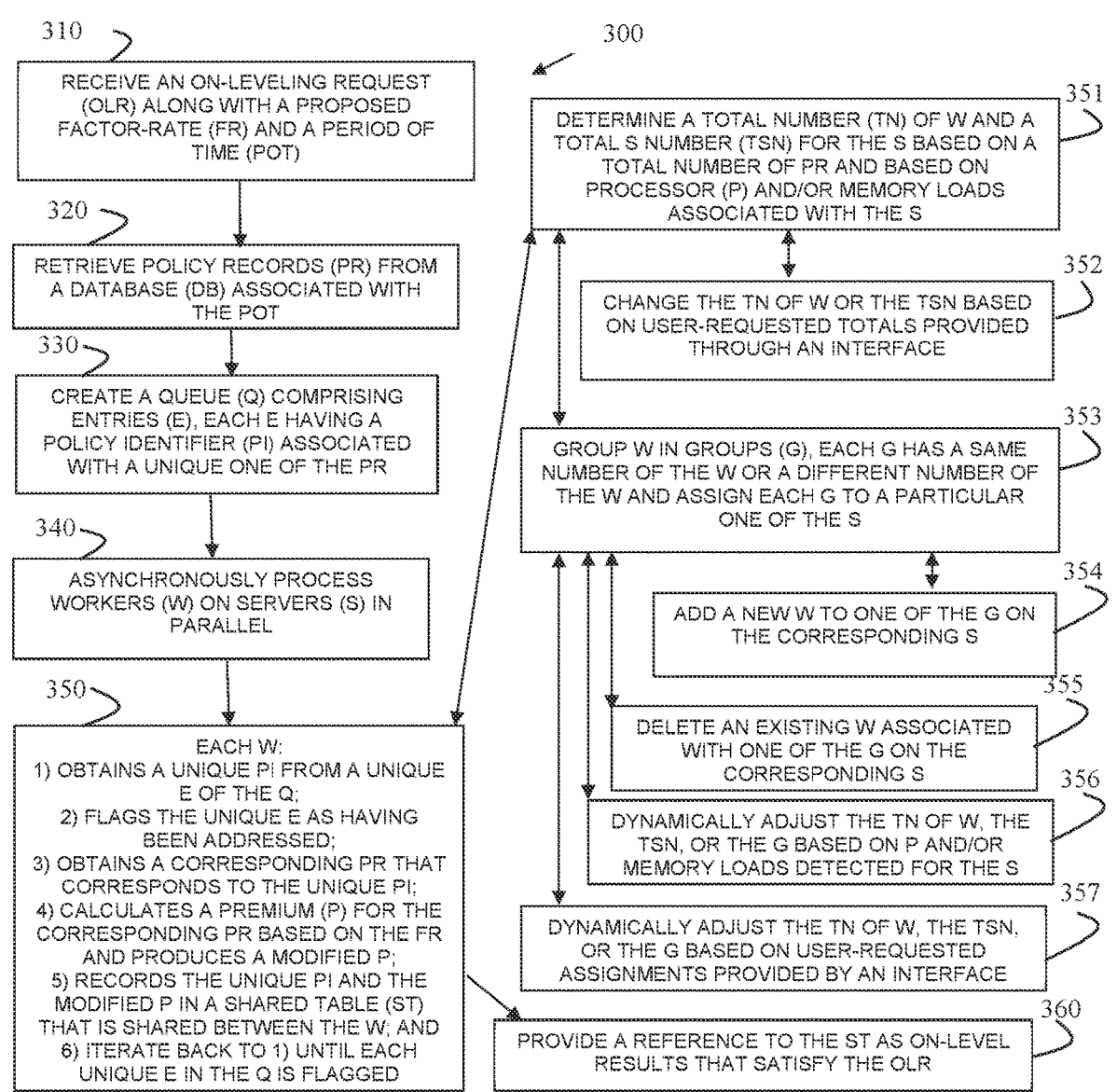

310

RECEIVE AN ON-LEVELING REQUEST (OLR) ALONG WITH A PROPOSED FACTOR-RATE (FR) AND A PERIOD OF TIME (POT)

320

RETRIEVE POLICY RECORDS (PR) FROM A DATABASE (DB) ASSOCIATED WITH THE POT

330

CREATE A QUEUE (Q) COMPRISING ENTRIES (E), EACH E HAVING A POLICY IDENTIFIER (PI) ASSOCIATED WITH A UNIQUE ONE OF THE PR

340

ASYNCHRONOUSLY PROCESS WORKERS (W) ON SERVERS (S) IN PARALLEL

350

EACH W:
1) OBTAINS A UNIQUE PI FROM A UNIQUE E OF THE Q;
2) FLAGS THE UNIQUE E AS HAVING BEEN ADDRESSED;
3) OBTAINS A CORRESPONDING PR THAT CORRESPONDS TO THE UNIQUE PI;
4) CALCULATES A PREMIUM (P) FOR THE CORRESPONDING PR BASED ON THE FR AND PRODUCES A MODIFIED P;
5) RECORDS THE UNIQUE PI AND THE MODIFIED P IN A SHARED TABLE (ST) THAT IS SHARED BETWEEN THE W; AND
6) ITERATE BACK TO 1) UNTIL EACH UNIQUE E IN THE Q IS FLAGGED

300

351

DETERMINE A TOTAL NUMBER (TN) OF W AND A TOTAL S NUMBER (TSN) FOR THE S BASED ON A TOTAL NUMBER OF PR AND BASED ON PROCESSOR (P) AND/OR MEMORY LOADS ASSOCIATED WITH THE S

352

CHANGE THE TN OF W OR THE TSN BASED ON USER-REQUESTED TOTALS PROVIDED THROUGH AN INTERFACE

353

GROUP W IN GROUPS (G), EACH G HAS A SAME NUMBER OF THE W OR A DIFFERENT NUMBER OF THE W AND ASSIGN EACH G TO A PARTICULAR ONE OF THE S

354

ADD A NEW W TO ONE OF THE G ON THE CORRESPONDING S

355

DELETE AN EXISTING W ASSOCIATED WITH ONE OF THE G ON THE CORRESPONDING S

356

DYNAMICALLY ADJUST THE TN OF W, THE TSN, OR THE G BASED ON P AND/OR MEMORY LOADS DETECTED FOR THE S

357

DYNAMICALLY ADJUST THE TN OF W, THE TSN, OR THE G BASED ON USER-REQUESTED ASSIGNMENTS PROVIDED BY AN INTERFACE

360

PROVIDE A REFERENCE TO THE ST AS ON-LEVEL RESULTS THAT SATISFY THE OLR

FIG. 3

ASYNCHRONOUS AND PARALLEL APPLICATION PROCESSING

RELATED APPLICATIONS

This application is a continuation of U.S. application Ser. No. 16/777,475, filed Jan. 30, 2020, which application is incorporated herein by reference in its entirety.

BACKGROUND

Computing power/throughput and memory speed/capacity have substantially increased in recent years. Moreover, processing chips have been miniaturized and embedded in the smallest of items, such as phones, watches, etc. However, some industry problems entail processing large volumes of data, such that even a powerful server is unable to completely process a given problem within a reasonable amount of time. Moreover, the logic of software that processes a given problem may itself create processing and memory bottlenecks by solving the problem in an inefficient and serialized manner.

BRIEF DESCRIPTION OF THE DRAWINGS

FIG. 2 is a diagram of a method for asynchronous and parallel application processing, according to an example embodiment.

FIG. 3 is a diagram of a method for asynchronous and parallel application processing, according to an example embodiment.

DETAILED DESCRIPTION

In various embodiments, methods and a system for asynchronous and parallel application processing are provided and described by way of example herein.

According to one aspect, a method for asynchronous and parallel application processing is presented. Input data associated with processing an application is queued in a queue. Threads are configured, the threads perform portions of the processing for the application with input parameter values provided as input to the application. The threads are initiated in combinations on servers. Each thread asynchronously performs processing in a parallel comprising: 1) obtaining a unique entry from the queue; 2) marking the unique entry as being addressed within the queue; 3) processing the input data associated with the unique entry using the input parameter values; 4) storing results obtained from the processing in a data store; and 5) obtaining a next unique entry from the queue and iterating back to the marking with the next unique entry as the unique entry until each entry in the queue is marked as being addressed. When each entry is marked as having been addressed a reference to the data is returned as application results for the application.

Figure 1:
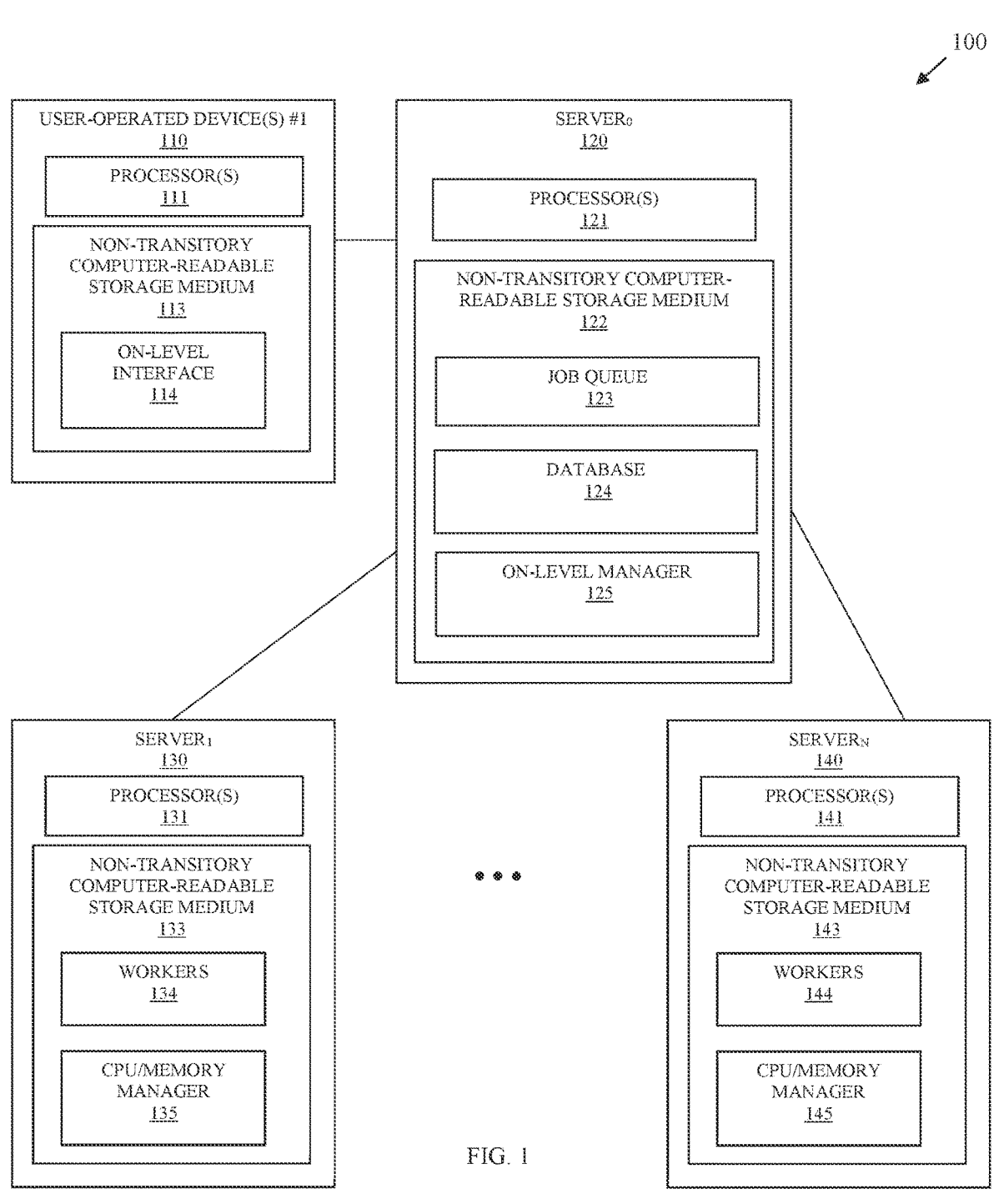
FIG. 1 is a diagram of a system for asynchronous and parallel application processing, according to an example embodiment.

FIG. 1 is a diagram of a system 100 for asynchronous and parallel application processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of asynchronous and parallel application processing, presented herein and below.

As used herein and below, the terms "user," "consumer," "user," "customer," and "insured" may be used interchangeably and synonymously. The terms refer to an individual policy holder of an insurer or a prospective policy holder.

A "policy" refers to a set of selected or assigned coverage conditions of an insured individual. A "premium" refers to a total amount of money that a given insured individual has to pay the insurer for having the policy with the insurer. "Factors" are numerical percentages assigned to coverage conditions. A "coverage condition" may also be referred to as a "rate." A factor is linked to a "base-factor dollar value," which is multiplied against that factor's determined rate. Each factor's determined rate is calculated via a set of factor-rate conditions, which provides that factor's rate and which is in turn multiplied against that factor's base-factor value, yielding a factor dollar amount for a given factor of the policy. The sum of dollar factor amounts for all the factors' is the premium for the policy.

One industry problem, which has been unable to be solved through existing hardware and software techniques, is associated with calculating the impact that occurs to existing policies and claims of an insurer when the insurer wants to change one or more rates, which were used in determining premiums of the existing policies. An insurer may have millions of policies and thousands of rates that are used in calculating premiums.

When actuaries are developing or trying to determine cost-effected rates, they must determine how much current rates have to change. But they are using premium values from multiple prior rate sets. As a result, actuaries will re-state the insurer's prior premiums as if the insureds were in the book at that time and were paying the current rates. This is called on-level where the premium history is forecasted at the current level of desired rates. This requires the actuaries to process software to see what the impact is going to be to the insureds if the existing premiums were re-calculated using the current/desired rates; or they may use approximation methods based on the history of rate changes (which may be less accurate). Comparing the trended historical claims to the on-level premiums gives the insurer an "apples-to-apples" comparison as to how proposed new rates would have performed over the previous historical time periods. Armed with this comparison, actuaries can make the appropriate changes to rates that are needed by the insurer. Even with improved and state-of-the-art hardware capabilities, insurers must wait weeks to months before receiving the on-leveling results. An average lag time in the industry is between 4-6 weeks. The problem is compounded when the actuaries want to iteratively perform on-leveling to arrive optimal rate changes.

As will be discussed in detail below, the system 100 permits increased processing throughput for processor and memory intensive applications. This is achieved through customizable and adjustable asynchronous parallel processing of application-based worker threads. The application is partially decomposed into the application-based worker threads, each thread performing similar operations but on different input data being processed by the application. The number of servers and/or the number of threads per server are adjustable to increase and/or achieve a desired throughput to completely process the application. An interface is provided to perform the customizations and adjustments. Moreover, memory load on each server is monitored as the worker threads associated with that server are processed and/or initiated, when the memory load is reaches a threshold configured level, a new server is acquired, and new threads are initiated on that new server. Once the application completely processes, the workers on the servers stop and are freed from the corresponding memories of the servers.

To illustrate various embodiments presented herein, the system 100 is discussed within the context of an insurance companies "on-leveling" process (which was discussed above). However, is should be appreciated that the embodiments are not so limited and may be applied to any processor and memory intensive applications/processes.

The system 100 includes a plurality of user-operated devices 110 and servers 120-140.

Each device 110-140 includes one or more hardware processors (111, 121, 131, and 141) and non-transitory computer-readable storage media (113, 123, 133, and 143). Each non-transitory computer-readable storage medium (113, 123, 133, and 143) comprises executable instructions, which when executed by the corresponding processor (111, 121, 131, and 141) causes that processor (111, 121, 131, and 141) to perform processing described herein and below within the context of on-level interface 114 (for user-operated device 110), on-level manager 125 (for server 120), workers 134 and Central Processing Unit (CPU-processor)/memory manager 135 (for server 130), and workers 144 and CPU/memory manager 145 (for server 140).

Non-transitory computer-readable storage medium 122 also includes a job queue 123 and a database 124 or data store 124. Job queue 123 comprises a data structure representing a queue, each cell of the queue comprising a pointer to a policy record within the database 124. The database 124 comprises a plurality of policy records indexed and linked to customer identifiers and customer records. The policy records comprise fields comprising: policy identifiers, coverage conditions/factors associated with the corresponding policy identifiers, current factors for the corresponding coverage conditions/factors, links to sets of factor-rate conditions for corresponding current factors (note the base-factor dollar amount may be in a field of the policy records or may be identified and obtained by each set of factor-rate conditions), claims made on the corresponding policy identifiers, dollar amounts claimed on the corresponding claims made, policy initiation dates, policy terminations dates, and premium values for the corresponding policy identifiers. It is noted that other types of records, such as customer records providing detailed customer information may be present in the database 124 as well. Furthermore, the policy records may include pointers, keys, or links to obtain various information associated with each of the fields.

Database 124 may also include a search and retrieval interface and/or Application Programming Interface (API) for conducting searches against records of database 124 using custom-defined search criteria and for retrieving results as records or tables comprising records as results.

Workers 134 and 144 are threads or instances of a software routine that can run in parallel within a same processing environment (on a same server) or across different processing environments (multiple disparate servers). Each worker 134 or 144 picks a policy record off the job queue and utilizes: a new proposed factor and factor rate, a proposed deleted factor and factor rate, or a changed factor rate for a given factor to calculate a new premium amount for the policy associated with the policy identifier of the policy record being processed by the worker 134 or 144. In an embodiment, each worker 134 or 144 can also calculate a new premium amount for a given policy based on multiple factor rate changes for multiple factors.

On-level interface 114 utilizes an API to interact with on-level manager 125 for purposes of receiving an on-leveling request along with proposed factor and corresponding factor rate changes that are being proposed with the request. The request can be for adding a new factor and corresponding factor rate(s), deleting an existing factor and its factor rate(s), and/or modifying an existing factor and its factor rate(s). The request can also include multiple changes to factor-rate combinations. In an embodiment, the request may also identify a time period for which the on-leveling is to begin, such as Jan. 1, 2010 (back 10 years).

On-level interface 114 may also include a user-control dial associated with a total number of requested workers 134 and 144 and servers 130 and 140. A default number of workers 134 and 144 may be displayed along with a default number of servers 130 and 140 through the interface 114. Additionally, the total number of workers 134 and 134 per each server 130 or 140 may be presented. The user/actuary operating device 110 may control the user-control dial to increase or decrease a desired number of workers 134 and 144, a desired number of servers 130 and 140, and a total number of workers 134 and 144 per each server 130 and 140.

In an embodiment, on-level manager based on database statistics associated with policy records of database 124 and current memory and processing loads of servers 130 and 140 may present an expected amount of elapsed time for processing the on-leveling request within interface 114 to the user based on the default-provided total number of workers 134 and 144, servers 130 and 140, and total number of workers 134 and 144 per server 130 and 140. The estimated amount of elapsed time for completing the processing of the on-leveling request may be updated by on-level manager as the user operated user-control dial and adjusts assignments and allocations.

In an embodiment, the user can adjust the assignments and allocations of workers 134 and 144 and servers 130 and 140 after the on-leveling request is initiated and already being processed by on-level manager 125. This permits dynamic and real-time adjustments to increase the processing throughput and decrease the completion time associated with the on-leveling request.

Once the on-leveling request is received by on-level manager 125 from interface 114, on-level manager 125 performs a search on database 124 to obtain the policy records for the time frame identified and populates references to each policy record (perhaps by policy identifier) into the job queue 123. Next, the default or custom changed worker 134 and 144 and server 130 and 140 allocations and assignments are performed by on-level manager 125 initiating instances of workers 134 and 144 in the appropriate numbers on the appropriate servers 130 and 140. On-level manager 125 provides each worker with a reference to the job queue 123 and the factor-rate changes identified in the on-leveling request.

Each instance of worker 134 or 144 grabs a unique one of the policy records from the job queue 123 and either removes the grabbed entry from job queue 123 or flags the entry as having been processed. Each instance of worker 133 or 144 processes the policy record using the inputted factor-rate changes to determine a new premium dollar amount for the corresponding policy associated with the policy record. The new premium amount for the policy record is then written to a common table (which all instances of the workers 134 and 144 write to) along with the policy identifier that corresponds to the corresponding policy record. The instances of the workers 133 and 143 process in parallel as threaded routines or functions. When a new premium for the corresponding policy is written to the common table of the database 124, the worker instance 134 or 144 that wrote the new premium, gabs a next entry from the job queue unless there is no remaining entries (indicating that the on-leveling request has completed).

CPU/Memory managers 135 and 145 monitor memory and processors 131 and 141 capacity and load as workers 134 and 144 are processing on servers 130 and 140, when a threshold capacity is reached a message is sent to on-level manager 125. On-level manager 125 may then notify some instances of the workers 134 or 144 on the corresponding server 130 or 140 to finish any existing policy record being processed and terminate. This frees up memory/processor cycles, decreases memory load, decreases processor load, and increases memory capacity and processor cycles on the corresponding server 130 or 140. Additionally, on-level manager 125 may initiate different instance of the terminated worker 134 or 143 on a new server 130 or 140 that previously did not have any workers 134 or 143. Also, instances of workers 134 or 143 may be initiated on a server 130 or 140 that has in-process instances of workers 134 or 144 but has memory/CPU capacity to handle the new instance of a worker 134 or 144 based on memory/processor load and capacity reported by that server's CPU/memory manager 135 of 145.

Once the job queue 123 is empty or completely flagged, the common table is returned or a reference to the common table having all the newly calculated premium amounts for the policies within the period being evaluated for the inputted factor-rate changes is returned back to interface 114. The user/actuary can then inspect the results for purposes of determining the impact that the factor-rate changes would have had and decide as to whether to move forward with the factor-rate changes or make additional changes to the factor-rate changes originally proposed and issue a new on-leveling request through the interface 114 to on-level manager 125.

It is to be noted that the ellipsis between server 130 and server 140 is intended to mean that there can any desired or configured number of servers from server₁ 130 to serverₙ 140. 2 servers were illustrated for ease of comprehension; however, this was done for convenience and it is to be understood that any number of servers can be deployed. Each such server including workers and CPU/memory managers.

It is also to be noted that server₀ 120 may include instances of workers and CPU/memory managers. That is, the workers and CPU/memory managers may process on a same server as does the on-level manager 125.

On-level manager 125 is also responsive to any changes made while an on-leveling request is in progress based on the user/actuary adjusting in real time the user-control dial of interface 114. Moreover, on-level manager 125 makes independent adjustments (number of workers and assignments of workers and servers) based on CPU/memory capacities and CPU/memory loads of servers 130 and 140 as reported by CPU/memory managers 135 and 145.

System 100 permits asynchronous parallel processing of an on-leveling application, which is dynamically adjustable in real time based on CPU/memory loads/capacities and user-provided adjustments. This dramatically decreases the elapsed time needed to complete the on-level application and substantially improves processing throughput and CPU/memory loads of the servers 130 and 140. Furthermore, because system 100 is user controlled, lower-priority on-leveling requests can intentionally utilize less workers 134 and 144 and/or servers 130 and 140. The control of the throughput in processing the on-leveling application resides with the user/actuary.

System 100 can process an on-leveling request in a substantially shorter period of time than what is currently available in the industry. For example, the industry typically requires 4-6 weeks to complete an on-leveling request, the present system 100 can take an hour or less and the amount of time needed to complete an on-leveling request can be user-driven based on priorities of the user, as discussed above.

The above-referenced embodiments and other embodiments are now discussed with reference to the FIGS. 2-4.

FIG. 2 is a diagram of a method 200 for asynchronous and parallel application processing, according to an example embodiment. The software module(s) that implements the method 200 is referred to as an "application-processing controller." The application-processing controller is implemented as executable instructions programmed and residing within memory and/or a non-transitory computer-readable (processor-readable) storage medium and executed by one or more processors of a plurality of devices. The processor (s) of the devices that execute the application-processing controller are specifically configured and programmed to process the application-processing controller. The application-processing controller may have access to one or more network connections during its processing. The network connections can be wired, wireless, or a combination of wired and wireless.

In an embodiment, a plurality of devices execute the application-processing controller as servers 120-140. In an embodiment, each server 120-140 is part of its own cloud processing environment comprising a plurality of servers logically cooperating within that cloud processing environment.

In an embodiment, the application-processing controller is a combination of on-level manager 125, workers 134 and 144, and CPU/memory managers 135 and 145.

At 210, the application-processing controller queues input data associated with processing an application in a queue. In an embodiment, the application is an on-leveling application or set of processes.

In an embodiment, at 211, the application-processing controller performs a query against a database for a given period of time that was provided with a request to process the application. The application-processing controller obtains the input data as input records.

In an embodiment of 211 and at 212, the application-processing controller records a record reference for each entry of the queue.

At 220, the application-processing controller configures threads that perform portions of the processing associated with the application with input parameter values that were provided as input to the application with the request to processing the application.

In an embodiment, at 221, the application-processing controller organizes sets of the threads and assigns each set to a particular one of the servers as a particular combination.

In an embodiment of 221 and at 222, the application-processing controller determines the sets and the combinations based on a control dial setting provided by a user through an interface when the user made a request to process the application.

In an embodiment, at 223, the application-processing controller obtains statistics associated with the input data and returns through an interface an estimated time to complete processing of the application based on the statistics and based on processor and/or memory loads associated with processors and/or memories of the servers.

At 230, the application-processing controller initiates the threads on servers in combinations.

At 240, the threads asynchronously process in parallel on the servers.

In an embodiment, at 241, the application-processing controller dynamically changes: a total number of the threads, a total server number for the servers, or a total-number-of-threads per server based on processor and/or memory loads associated with memories and processors of the servers.

In an embodiment, at 242, the application-processing controller dynamically changes: a total number of the threads, a total server number for the servers, or a total-number-of-threads per server based on a control dial setting provided by a user through an interface when the user made a request to process the application.

At 250, each thread performs independent processing that: 1) obtains a unique entry from the queue; 2) marks the unique entry as having been addressed in the queue; 3) processes the input data associated with the unique entry using the input parameter values; 4) stores results obtained from 3) in a data store; and 5) iterates back to 1) with a next entry as the unique entry until each entry in the queue is marked as being addressed.

It is noted that the processing at 240 and 250 occurs concurrently, such that embodiments 241 and 242 occur while each of the threads are asynchronously processing in parallel on the servers.

At 250, the application-processing controller returns a reference to the data store as application results associated with processing the application. FIG. 3 is a diagram of another method 300 for asynchronous and parallel application processing, according to an example embodiment. The software module(s) that implements the method 300 is referred to as an "on-level manager." The on-level manager is implemented as executable instructions programmed and residing within memory and/or a non-transitory computer-readable (processor-readable) storage medium and executed by one or more processors of a plurality of devices. The processors that execute the on-level manager are specifically configured and programmed to process the on-level manager. The on-level manager may have access to one or more network connections during its processing. The network connections can be wired, wireless, or a combination of wired and wireless.

In an embodiment, a plurality of devices execute the on-level manager as servers 120-140. In an embodiment, each server 120-140 is part of its own cloud processing environment comprising a plurality of servers logically cooperating within that cloud processing environment.

In an embodiment, the on-level manager is all of, or some combination of on-level manager 125, workers 134 and 144, CPU/memory managers 135 and 145, and/or the method 200.

The on-level manager presents another and, in some ways, enhanced processing perspective of the method 200.

At 310, the on-level manager receives an on-leveling request along with a proposed factor-rate and a period of time.

At 320, the on-level manager retrieves policy records from a database associated with the period or time or defined by the period of time.

At 330, the on-level manager creates a queue comprising entries. Each entry having a policy identifier associated with a unique one of the policy records.

At 340, the on-level manager asynchronously processes a plurality of workers in parallel on a plurality of servers.

At 350, each worker performs processing that: 1) obtains a unique policy identifier from a unique entry of the queue; 2) flags the unique entry as having been addressed; 3) obtains a corresponding policy record that corresponds to the unique policy identifier; 4) calculates a premium for the corresponding policy record based on the factor-rate and produces a modified premium; 5) records the unique policy identifier and the modified premium in a shared table that is shared between the workers; and 6) iterates back to 1) until each unique entry in the queue is flagged as having been addressed.

In an embodiment, at 351, the on-level manager determines a total number of workers and a total server number for the servers based on a total number of policies records and based on processor and/or memory loads associated with memories of the servers.

In an embodiment of 351 and at 352, the on-level manager changes the total number of workers or the total server numbers based on user-requested totals provide through an interface.

In an embodiment of 351 and at 353, the on-level manager groups the workers into groups. Each group has a same number of workers or a different number of workers. Each group is assigned to a particular one of the servers.

In an embodiment of 353 and at 354, the on-level manager adds a new worker to one of the groups on the corresponding server.

In an embodiment of 353 and at 355, the on-level manager deletes an existing worker associated with one of the groups on the corresponding server.

In an embodiment of 353 and at 356, the on-level manager dynamically adjusts the total number of workers, the total server number for the servers, or the groups based on processor and/or memory loads detected for processors and/or memories of the servers.

In an embodiment of 353 and at 357, the on-level manager dynamically adjusts the total number of workers, the total server number of servers, or the groups based on user-requested assignments provided by a user through an interface.

At 360, the on-level manager provides a reference to the shared table as on-level results that satisfy the on-leveling request.

Figure 4:
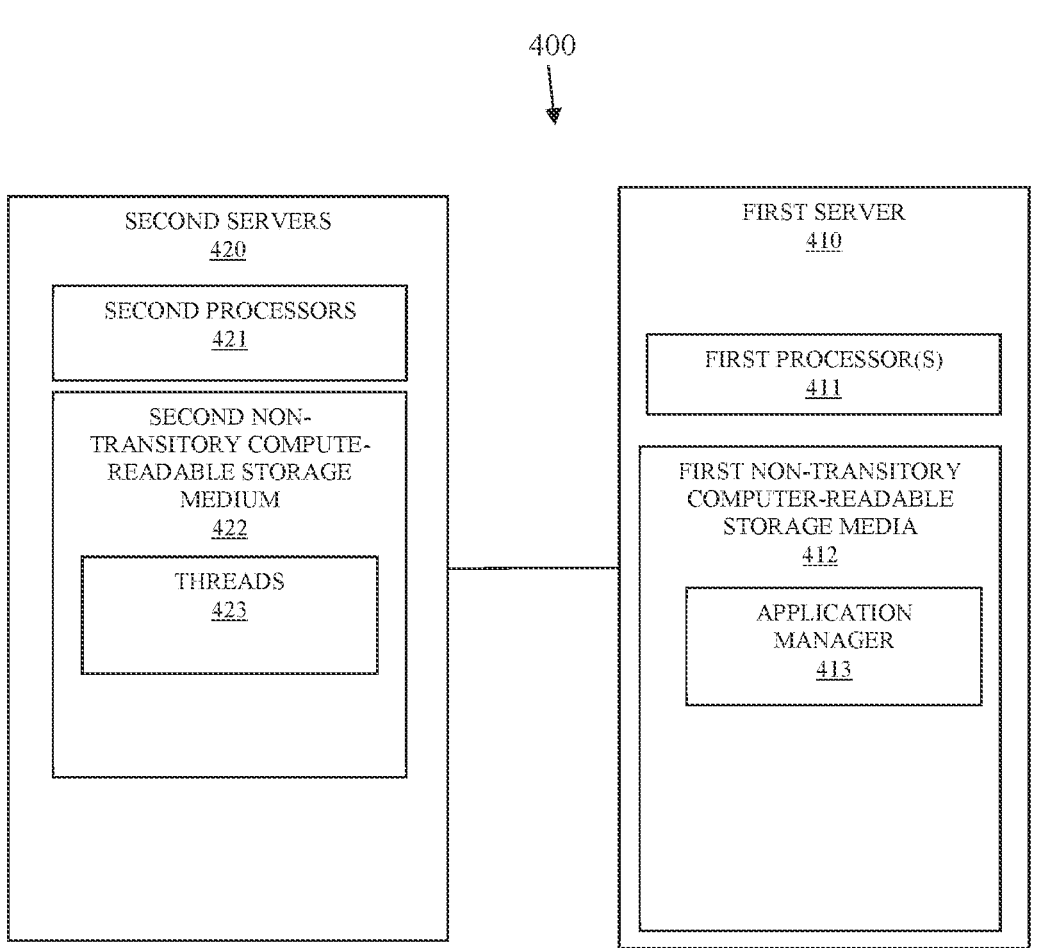
FIG. 4 is a diagram of another system for asynchronous and parallel application processing, according to an example embodiment.

FIG. 4 is a diagram of another system 400 for asynchronous and parallel application processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 100 includes: a first server 410 (a first cloud processing environment 410 or a first server system 410) comprising first processors 411 and a first non-transitory computer-readable storage media 412. The media 412 comprising executable instructions representing an application manager 413.

The system 100 also includes a plurality of second servers 420 (second cloud processing environments 420 or second server systems 420), each second server 420 comprises one or more second processors 421 and a second non-transitory computer-readable storage medium 422. The media 422 comprising executable instructions representing one or more threads.

The application manager 413 when executed by first processor 411 from first media 412 causes the first processor 411 to performing operations comprising: 1) receiving an application request to process an application with input parameters; 2) obtaining input records from a database based on the request; 3) referencing each input record as an entry in a queue; 4) determining a total thread number for the threads and a total second server number for the second servers; 5) determining groupings for the threads for each of the second servers, each grouping including a same number of the threads or a different number of the threads; 6) assigning each grouping to a particular one of the second servers; 7) instantiating each thread within each grouping on each of the second servers to process asynchronously and in parallel with one another; 8) dynamically adjusting each grouping, the total thread number, and the total server number as the threads process on the second servers based at least on processor loads and/or memory loads associated with the second servers; and 9) returning a reference to a shared data store representing application results for processing an application associated with the threads once each entry of the queue is processed by the threads to satisfy the application request.

In an embodiment, the application manager 111 when executed by first processor 411 from first media 412 further causes the first processor 411 to perform additional operations comprising: 10) dynamically adjusting at least one grouping, the total thread number, or the total server number based on a user-assignment made through an interface.

Each thread 423 when executed by the corresponding second processor 421 from the corresponding second non-transitory computer-readable storage medium 422 on the corresponding second server 420 causes the corresponding second processor 421 to perform operations comprising: 1) obtaining an entry from the queue; 2) flagging the entry within the queue as having been addressed; 3) obtaining an input record corresponding to the entry; 4) processing the input record using the input parameters producing entry results for the entry; 5) recording the entry results in the shared data store; and 6) iterating back to obtain a next entry from the queue as the entry until each entry of the queue is flagged as having been addressed.

In an embodiment, the application request is an on-leveling request associated with performing on-leveling for an insurance company when a factor-rate combination is being added, deleted, and/or changed to determine the impact on existing policies and premiums.

To illustrate the methods and systems disclosed herein, a non-limiting list of embodiments is provided here:

Example 1 is a method for asynchronous and parallel application processing. Input data associated with processing an application is queued in a queue. Threads that perform portions of the processing for the application are configured with input parameter values provided as input to the application. The threads are initiated treads on servers in combinations. Each thread asynchronously performs processing in a parallel comprising: 1) obtaining a unique entry from the queue; 2) marking the unique entry as being addressed within the queue; 3) processing the input data associated with the unique entry using the input parameter values; 4)

storing results obtained from the processing in a data store; and 5) obtaining a next unique entry from the queue and iterating back to the marking with the next unique entry as the unique entry until each entry in the queue is marked as being addressed. A reference to the data store is then as application results for the application.

Example 2 includes example 1 and performs a query against a database for a given period of time provided with a request to process the application and obtaining the input data as input records that satisfy the query.

Example 3 includes any one of examples 1-2 and records a record reference for each input record as each entry of the queue.

Example 4 includes any one of examples 1-3 and organizes sets of the threads and assigning each set to a particular one of the servers as a particular combination.

Example 5 includes any one of examples 1-4 and determines the sets and the combinations based on current processor loads and/or memory loads of the servers.

Example 6 includes any one of examples 1-5 and determines the sets and the combinations based on a control dial setting provided by a user through an interface when the user made a request to process the application.

Example 7 includes any one of examples 1-6 and obtains statistics associated with the input data and returns through an interface an estimated time to complete processing of the application based on the statistics and based on a total thread number for the threads and a total server number for the servers.

Example 8 includes any one of examples 1-7 and each thread asynchronously performs processing in a parallel further comprises dynamically changing: a total number of the threads, a total number of the servers processing the threads, or a total-number-of threads per server based on processor and/or memory loads associated with the servers.

Example 9 includes any one of examples 1-8 and each thread asynchronously performs processing in a parallel further comprises dynamically changing: a total number of the threads, a total number of the servers processing the threads, or a total-number-of threads per server based a control dial setting provided by a user through an interface when the user made a request to process the application.

Example 10 includes a method for asynchronous and parallel application processing. An on-leveling request is received along with a proposed factor-rate and a period of time. Policy records are retrieved from a database associated with the period of time. A queue is created, the queue comprising entries, each entry having a policy identifier associated with a unique one of the policy records. Workers are asynchronously processed in parallel on servers. Each worker performs processing comprising: 1) obtaining a unique policy identifier from a unique entry of the queue; 2) flagging that unique entry as having been addressed; 3) obtaining a corresponding policy record that corresponds to the unique policy identifier; 4) calculating a premium for the corresponding policy record based on the proposed factor rate and producing a modified premium; 5) recording the unique policy identifier and the modified premium in a shared table that is shared between the workers; and 6) iterating back to the obtaining (1) until each unique entry in the queue is flagged. A reference to the shared table is provided as on-level results that satisfy the on-leveling request.

Example 11 includes example 10 and determines a total number of the workers and a total server number for the servers based on a total number of the policy records and based on processor and/or memory loads associated with the servers.

Example 12 includes any of examples 10-11 and changes the total number of the workers or the total server number based on user-requested totals provided through an interface.

Example 13 includes any of examples 10-12 and groups workers in groups, each group have a same number of the workers or a different number of the workers and assigning each group to a particular one of the servers.

Example 14 includes any of examples 10-13 and dynamically adds a new worker to one of the groups on the corresponding server.

Example 15 includes any of examples 10-14 and dynamically deletes an existing worker associated with one of the groups on the corresponding server.

Example 16 includes any of examples 10-15 and while the workers are asynchronously processing in parallel dynamically adjusts the total number of the workers, the total server number for the servers, or the groups based on processor and/or memory loads detected for the servers.

Example 17 includes any of examples 10-16 and while the workers are asynchronously processing in parallel dynamically adjusts the total number of the workers, the total server number for the servers, or the groups based on user-requested assignments provided through an interface.

Example 18 includes a system for asynchronous and parallel application processing. The system comprises a first server and a plurality of second servers. The first server comprises a first processor and a first non-transitory computer-readable storage medium having executable instructions representing an application manager. Each second server 420 comprises a second processor and a second non-transitory computer-readable storage medium having executable instructions representing one or more threads. The application manager when executed by the first processor from the first non-transitory computer-readable storage medium causes the first processor to perform operations comprising: 1) receiving an application request to process an application with input parameters; 2) obtaining input records from a database based on the request; 3) referencing each input record as an entry in a queue; 4) determining a total thread number for the threads and a total second server number for the second servers; 5) determining groupings for the threads for each of the second servers, each grouping including a same number of the threads or a different number of the threads; 6) assigning each grouping to a particular one of the second servers; 7) instantiating each thread within each grouping on each of the second servers to process asynchronously and in parallel with one another; 8) dynamically adjusting each grouping, the total thread number, and the total server number as the threads process on the second servers based at least on processor loads and/or memory loads associated with the second servers; and 9) returning a reference to a shared data store representing application results for processing an application associated with the threads once each entry of the queue is processed by the threads to satisfy the application request. Each thread when executed by the corresponding second processor from the corresponding second non-transitory computer-readable storage medium on the corresponding second server 420 causes the corresponding second processor to perform operations comprising: 1) obtaining an entry from the queue; 2) flagging the entry within the queue as having been addressed; 3) obtaining an input record corresponding to the entry; 4) processing the input record using the input parameters producing entry results for the entry; 5) recording the entry results in the shared data store; and 6) iterating back to obtain a next entry from the queue as the entry until each entry of the queue is flagged as having been addressed.

Example 19 includes example 18, wherein the application request is an on-leveling request.

Example 20 includes any of examples 18-19 and the application manager when executed by first processor from first media further causes the first processor to perform additional operations comprising: 10) dynamically adjusting at least one grouping, the total thread number, or the total server number based on a user-assignment made through an interface.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

initiating a total number of asynchronous threads on a total number of servers, wherein each asynchronous thread processes a portion of input data provided to an application, and wherein the asynchronous threads as a whole perform a portion of processing for the application, and dynamically changing one or more of the total number of asynchronous threads and the total number of servers after the initiating based on real-time adjustments to processing resources, wherein the adjustments are determined by a CPU or memory manager of the servers that monitors real-time processor and memory loads and configures the asynchronous threads to optimize processing throughput and reduce completion time for the application, wherein each thread asynchronously performs processing in parallel further comprises;

dynamically changing:

the total number of the asynchronous threads, the total number of the servers processing the asynchronous threads, or a total-number-of threads per server based on the real-time processor loads or memory loads associated with the servers;

wherein the dynamic changing occurs while the application is being processed to optimize processing throughput and reduce completion time for the application by monitoring memory load on each server as worker threads associated with that server are processed, and when the memory load reaches a threshold configured level, acquiring a new server and initiating new threads on the new server;

wherein the CPU or memory manager sends a message to an application manager when the threshold configured level is reached, and the application manager notifies instances of the asynchronous threads on the corresponding server to finish processing and terminate, and the application manager initiates different instances of the terminated asynchronous threads on the new server;

wherein the application is an on-leveling application or set of processes.

2. The method of claim 1 further comprising:

storing results received from the asynchronous threads in a data store as each asynchronous thread completes processing a corresponding portion of the input data; and providing a reference to the data store as output to the application for the portion when a last asynchronous thread completes processing.

3. The method of claim 1, wherein initiating further includes receiving the total number of the asynchronous threads as a user-provided input through an interface.

4. The method of claim 3, wherein receiving further includes determining the total number of servers based on the total number of asynchronous threads received as the user-provided input through the interface.

5. The method of claim 1, wherein dynamically changing further includes modifying one or more of the total number of asynchronous threads and the total number of servers based on processing loads for processors of the servers and memory loads for memories of the servers.

6. The method of claim 1, wherein dynamically changing further includes modifying the total number of servers based on a modified total number of asynchronous threads received from a user through an interface.

7. The method of claim 1, wherein initiating further includes calculating an estimated time of completion for the application based on processor and memory loads for the total number of servers and based on the total number of asynchronous threads and providing the estimated time of completion to a user through an interface.

* * * * *